March 13, 1945. F. E. JOHNSON Re. 22,618

FASTENER AND FASTENER INSTALLATION

Original Filed March 21, 1938

Inventor:
Frank E. Johnson.
by Walter S. Jones Att'y.

Reissued Mar. 13, 1945

Re. 22,618

UNITED STATES PATENT OFFICE 22,618

FASTENER AND FASTENER INSTALLATION

Frank E. Johnson, Malden, Mass., assignor to United-Carr Fastener Corporation, Cambridge, Mass., a corporation of Massachusetts Original No. 2,252,932, dated August 19, 1941, Serial No. 197,144, March 21, 1938. Application for reissue February 27, 1942, Serial No. 432,703

8 Claims. (Cl. 85—32)

This invention relates to improvements in fasteners and fastener installations and particularly to nut members and installations of the same.

An object of my invention is to provide a nut member which may be snapped through an opening in a supporting plate where there is access to only one side of said plate so as to be firmly assembled with said plate for receiving a cooperating bolt member.

Other objects and purposes of my invention will be apparent from inspection of the drawing and specification herein set forth.

Referring to the drawing, in which I have illustrated a preferred embodiment of my invention:

Figure 1:
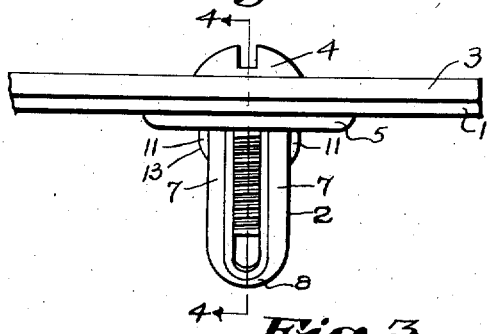
Fig. 1 is an edge view showing an installation comprising a plate, my improved nut member assembled with the plate and another part secured to the plate by a bolt engaged with the nut.
Figure 2:
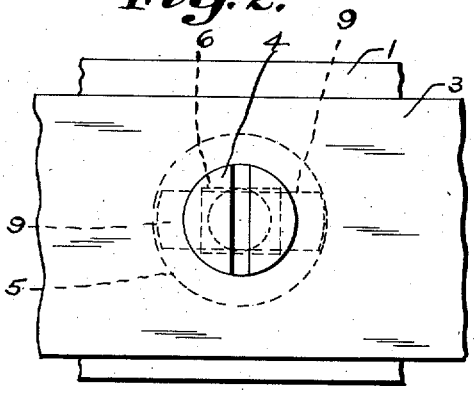
Fig. 2 is a top plan view of the installation shown in Fig. 1.
Figure 3:
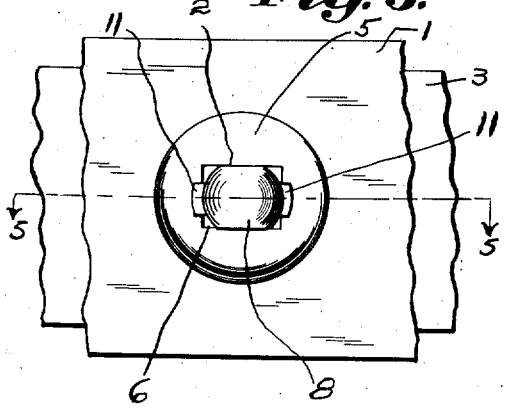
Fig. 3 is a bottom plan view of the installation shown in Figs. 1 and 2.
Figure 4:
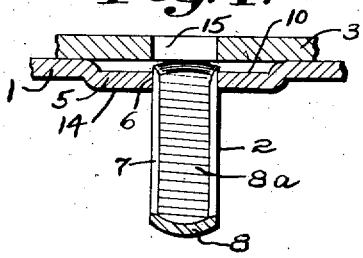
Fig. 4 is a section taken along the line 4—4 of Fig. 1 with the bolt member omitted.
Figure 5:
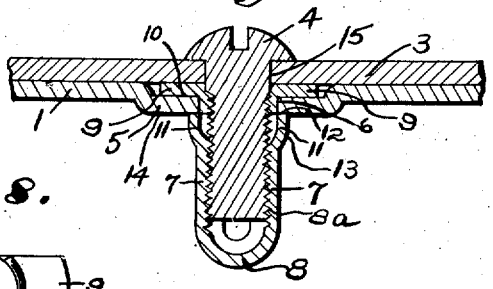
Fig. 5 is a section taken along the line 5—5 of Fig. 3.
Figure 6:
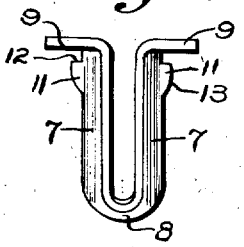
Fig. 6 is an edge view of my improved nut member per se.
Figure 8:
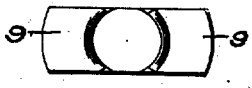
Fig. 8 is a top view of my improved nut member per se.
Figure 7:
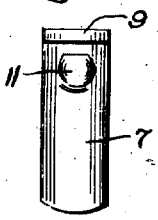
Fig. 7 is a side view of my improved nut member per se, as shown in Fig. 6.

Referring to Figs. 1–5 of the drawing, I have shown a preferred nut installation comprising a supporting structure in the form of a thin metal plate 1, my improved nut member 2 assembled with the plate, and another part, such as the thin supporting plate 3, secured in superposed relation to the plate 1 through means of a bolt 4 in cooperating threaded engagement with the nut 2. The supporting plate 1 is provided with a countersunk portion 5 having an opening 6 therein. The opening 6 is preferably rectangular in shape for aiding to prevent rotation of the nut relative to the plate during engagement of the bolt therewith.

Referring in detail to my improved nut member 2, I have shown one which is preferably formed of one-piece spring metal. My preferred nut member has a bolt-receiving shank-like part comprising a pair of opposed yieldable legs 7—7 connected together at one end of the shank-like part by a bight 8. Each of the legs 7 has a threaded portion 8a formed by any suitable method on its inner surface and adapted for cooperating fastener engagement with a threaded bolt. In my preferred form each of the legs is bowed so as to be of curved shape in its transverse cross-section whereby the shank-like part of the nut 2 provides a substantially circular bolt-receiving seat for better engagement with the threads of the bolt member. At an opposite end of the shank-like part from the bight 8 I have provided support-engaging portions in the form of flanges 9—9 which extend laterally from the free ends of the legs 7—7 in opposite directions one to another. The flanges 9—9 have a greater end-to-end dimension than the longitudinal diameter of the aperture 6 of the plate 1 and are adapted to engage an upper surface 10 of the plate 1 adjacent the aperture 6, as most clearly shown in Fig. 5. As a means for attachment of the nut to a support I have provided laterally-extending support-engaging portions in the form of bumps 11—11 pressed from the material of the legs 7—7 and extending outwardly from the legs 7—7 in spaced relation to the flanges 9—9. Each of the bumps 11 has a shoulder 12 facing the flanges 9—9 and an outer surface 13 which, in my preferred form, is inclined from adjacent the laterally outermost point of the shoulder 12 to the plane of the respective leg 7. The distance between the inclined surfaces 13 of the bumps 11—11 is greater than the longitudinal diameter of the aperture 6 of the support 1 whereby the surfaces 13 act as cams for pressing the legs 7—7 toward each other to effect entrance of the nut member through the aperture 6 of the plate 1, as will be described.

Assembly of the nut member 2 with the plate 1 is a very simple matter and may be carried out entirely from a position outside the outer surface 10 of the plate. Thus the bight end 8 of the nut member is inserted through the aperture 6 of the plate 1 until the inclined surfaces 13 of the bumps 11—11 engage the surface 10 of the plate adjacent the aperture 6. Next, pressure is exerted upon the flanges 9—9 so as to force the bumps 11—11 through the aperture. This last-mentioned action is effected by reason of engagement of the inclined surfaces 13 of the bumps with material of the plate 1 adjacent the aperture 6 which serves to cam the legs 7—7 toward each other. After the bumps 11—11 have passed through the aperture 6, the legs 7—7 expand through reason of resiliency set up by the bight 8 so as to dispose the shoulders 12—12 behind the inner surface 14 of the plate 1. As a result of this action the shoulders 12—12, which are preferably in substantial engagement with the surface 14 of the plate 1, cooperate with the flanges 9—9 disposed opposite the outer surface 10 of the plate so as to secure the nut to the plate. The plate member 3 may now be superposed upon the surface 10 of the plate 1 with an aperture 15 of the plate 3 in alignment with the bolt-receiving shank of the nut. Finally, the bolt 4 is extended through the aperture 15 of the plate 3 into threaded engagement with the threaded portions 8 of the nut. As the bolt is threaded into the nut the shoulders 12 of the bumps 11—11 are drawn against the inner surface 14 of the plate 1 adjacent the aperture 6, as most clearly shown in Fig. 5, thus providing a secure and efficient fastener device.

As a result of my invention I have provided a nut of simple and inexpensive construction which may be quickly and easily assembled with a supporting plate where access is had to one surface only of the plate thus efficiently carrying out a useful object in the art.

Although I have illustrated and described a preferred form of my invention, I do not wish to be limited thereby because the scope of my invention is best defined in the following claims.

I claim:

1. A fastening device for securing an apertured metallic member to an apertured support comprising a nut member adapted to be inserted through the aperture in said support formed of a single piece of relatively stiff sheet metal and providing a pair of spaced laterally yieldable leg portions connected at the entering end by a bend forming a U-shaped shank which is rigid against axial deformation when in use, a flange portion extending laterally from the opposite end of each leg portion and adapted to overlie a part of the support surrounding the aperture through which said shank may be inserted, a laterally projecting shoulder on the outer face of each leg portion spaced from said flange portion for engagement with the opposite face of said support for preventing displacement of said nut member axially from said support after said member has been snapped in place therein, the inner faces of said leg portions being threaded throughout a substantial portion of their length and presenting a substantially uniform diameter threaded bore, and a threaded fastening member insertable through the apertured metallic member and into the shank from the flanged end, engaging the threaded legs throughout a substantial length thereof, for axially clamping the support and metallic member between the fastening member and the laterally projecting shoulders of said nut member.

2. A fastening device for attachment to an apertured support comprising a nut member adapted to be inserted through the aperture of said support formed of a single piece of relatively stiff folded sheet metal providing a pair of spaced leg portions connected at the entering end by a resilient bend forming a U-shaped shank, which is rigid against axial deformation when in use, a flange portion extending laterally from the opposite end of each leg portion and adapted to overlie a part of the support surrounding the aperture through which said shank may be inserted, a laterally projecting shoulder on the outer face of each leg portion of substantially less width than the width of said leg portion and spaced from said flange portion for engagement with the opposite face of said support, said shoulders increasing the overall cross sectional dimension of the nut member in one direction to greater than that of the aperture in which it is inserted whereby it will be self-expanding and snap into engagement with the walls of the aperture, the inner faces of said leg portions being threaded throughout a substantial portion of their length but short of the U-shaped bend and presenting a substantially uniform diameter threaded bore, and a threaded screw insertable into the shank from the flanged end and engaging the threaded legs throughout a substantial length thereof for preventing inward flexing of the legs.

3. A fastening device for use in assembling an apertured supporting panel and a part to be secured to said panel, said fastening device including a sheet metal stud-receiving member adapted to be assembled with said panel through its aperture and a stud for engagement with said stud-receiving member for holding said part to said panel, said stud-receiving member comprising a resilient shank having spaced wall portions defining an axial opening receiving said stud, panel-engaging means at one end of said shank to limit the axial movement of said stud-receiving member through said aperture in one direction, projections integrally joined to said wall portions and movable therewith toward and away from each other as a result of the insertion of the fastening device in the supporting panel aperture and adapted to engage said panel to limit axial movement of said stud-receiving member through said aperture in an opposite direction and other portions integral with said wall portions between their ends for engaging said stud when the parts of the installation are in final assembly thereby to hold them together.

4. A fastening device for use in assembling an apertured supporting panel and a part to be secured to said panel, said fastening device including a sheet metal stud-receiving member adapted to be assembled with said panel through its aperture and a stud for engagement with said stud-receiving member for holding said part to said panel, said stud-receiving member comprising a resilient shank having a pair of spaced wall portions, said wall portions being of generally curved cross-sectional shape and defining an axial opening for receiving said stud between them, panel-engaging means at one end of said shank to limit axial movement of said stud-receiving member through said aperture in one direction, projections integrally joined to said wall portions and formed from material within marginal edges thereof, said projections being movable toward and away from each other with the wall portions as a result of the insertion of the fastening device in the supporting panel aperture and including shoulders for engagement with said panel and elements extending from said wall portions between their ends into said axial opening for engaging said stud when the parts of the installation are in final assembly.

5. A fastening device for use in assembling an apertured supporting panel and a part to be secured to said panel, said fastening device including a sheet metal stud-receiving member adapted to be assembled with said panel through its aperture and a stud for engagement with said stud-receiving member for holding said part to said panel, said stud-receiving member comprising a resilient shank having a pair of spaced wall portions defining an axial passage for receiving said stud, portions extending laterally from said wall portions at one end of said shank for engaging said panel, a portion connecting said wall portions at an opposite end of said shank, projections integrally joined to said wall portions and movable therewith toward and away from each other as a result of the insertion of the fastening device in the supporting panel aperture, each of said projections having a shoulder disposed laterally on said respective wall portions for engaging said panel and elements extending from said walls between their ends into said axial passage for engaging said stud when the parts of the installation are in final assembly.

6. A fastening device for securing an apertured member to an apertured support, comprising a fastening member adapted to be inserted through the support aperture and formed of a single piece of sheet metal and having a pair of spaced laterally yieldable leg portions connected at the entering end by a bight portion and forming a shank, a flange portion extending laterally from the opposite end of each leg portion and adapted to overlie a part of the support surrounding the aperture through which said shank may be inserted, a laterally projecting shoulder on each leg portion spaced from said flange portion for engagement with the opposite face of said support for preventing displacement of said fastening member axially from said support after it has been inserted in place therein, said shoulders increasing the overall cross sectional dimension of the nut member in one direction to greater than that of the aperture in which it is inserted whereby it will be self-expanding and snap into engagement with the walls of the aperture, the inner faces of said leg portions defining a stud-receiving bore, and means in said bore adapted for locking engagement with a stud inserted therein.

7. A fastening device comprising a sheet metal stud-receiving member having spaced laterally yieldable wall portions defining an axial stud-receiving opening and forming a resilient shank, panel-engaging means at one end of said shank, projections integrally joined to said wall portions below said panel-engaging means, and stud-engaging means integral with said wall portions between the ends thereof, said fastening device being adapted to be assembled in an aperture of a panel with the panel-engaging means limiting axial movement of the fastener in one direction and the integral projections being movable toward and away from each other as a result of the insertion of the fastening device in the panel aperture and adapted to engage the panel and limit axial movement of the fastener in an opposite direction, and said stud-engaging means being adapted to engage a stud inserted in the stud-receiving opening to hold the parts together in final assembly.

8. A fastening device comprising a nut member formed of a single piece of sheet metal and having a pair of spaced laterally yieldable leg portions connected at one end by a bight portion and forming a shank, a support-engaging flange portion extending laterally from the opposite end of each leg portion, a laterally projecting support-engaging shoulder on the outer face of each leg portion spaced from said flange portion, said shoulders increasing the over-all cross sectional dimensions of the nut member in one direction to greater than that of an aperture in which the shank is inserted whereby the shank will be self-expanding and will snap into engagement with the aperture walls, the inner faces of said leg portions defining a stud-receiving bore and means in said bore adapted for locking engagement with a stud inserted therein, said support-engaging flanges and laterally projecting shoulders being adapted to engage opposite faces of an apertured support through which said shank has been inserted to resist axial movement of said shank in opposite directions therein.

FRANK E. JOHNSON.